United States Patent

[11] 3,589,390

| [72] | Inventor | Virgil L. Frantz<br>Salem, Va. |
|---|---|---|
| [21] | Appl. No. | 769,901 |
| [22] | Filed | Oct. 23, 1968 |
| [45] | Patented | June 29, 1971 |
| [73] | Assignee | Graham-White Sales Corporation<br>Salem, Va. |

[54] PRESSURE RELIEF VALVE FOR DIESEL LOCOMOTIVE COMPRESSED AIR SYSTEMS
7 Claims, 5 Drawing Figs.

| [52] | U.S. Cl. | 137/489.5 |
|---|---|---|
| [51] | Int. Cl. | F16k 17/10 |
| [50] | Field of Search | 137/488, 489.5, 509, 489; 251/28 |

[56] References Cited
UNITED STATES PATENTS

| 120,958 | 11/1871 | Garland | 137/489.5 |
|---|---|---|---|
| 559,881 | 5/1896 | Ahrens | 137/489.5 |
| 1,369,050 | 2/1921 | Quick | 137/509 X |
| 1,474,590 | 11/1923 | Holdsworth | 137/509 X |
| 2,955,612 | 10/1960 | Moser | 137/489.5 |

FOREIGN PATENTS

| 474,253 | 10/1937 | Great Britain | 137/489.5 |
|---|---|---|---|

*Primary Examiner*—M. Cary Nelson
*Assistant Examiner*—R. B. Rothman
*Attorney*—Wilmer Mechlin ABSTRACT: A pressure relief valve combining main and pilot valves, the main valve having as a valve member a differential piston with a small head exposed and a large head normally unexposed to line pressure and the pilot valve being adjustable to open under a predetermined line pressure for substantially statically applying pressure to the large head of an shifting the main valve member to open position without producing flutter.

INVENTOR
VIRGIL L. FRANTZ
BY Wilmer Mechlin
HIS ATTORNEY

PATENTED JUN29 1971

INVENTOR
VIRGIL L. FRANTZ
BY Wilmer Mecklin
HIS ATTORNEY

PRESSURE RELIEF VALVE FOR DIESEL LOCOMOTIVE COMPRESSED AIR SYSTEMS

BACKGROUND OF THE INVENTION

While compressors of diesel locomotives are equipped with governors, in a locomotive consist the compressors are so connected and synchronized that all will continue to supply compressed air so long as there is demand anywhere in the system. Even without governor failure, some of the compressors thus can supply air at an unsafe pressure to adjoining parts of the system. That problem heretofore has been solved by installing in the line on the output side of each compressor a poppet-type pressure relief valve having a return spring normally holding the valve member closed and yieldable to permit the valve member to open under a predetermined pressure, usually on the order of 150 lbs. p.s.i. Having its surface to which the opening force is applied constantly exposed to line pressure, the valve member in opening over-compresses the spring and this and the dependence upon the dynamic pressure of the outrushing air exhausting through the valve to hold the valve member open, cause the valve member to flutter during exhausting with consequent excessive wear upon itself and inability of the valve to hold the line pressure within limits of less than about 10 lbs. p.s.i. It is to this latter problem that the present invention is particularly directed.

The primary object of the present invention is to provide in a diesel locomotive compressed air system an improved pressure relief valve connectable to a line on the output side of a compressor, which by combining with a main valve a pilot valve openable under a predetermined pressure for applying opening pressure to the main valve and applying that pressure to a surface of the main valve not exposed to exhausting air, effectively eliminates flutter of the main valve and enables the pressure in the line to be held within narrow limits.

Another object of the invention is to provide an improved pressure relief valve for a diesel locomotive compressed air system which in addition to the foregoing characteristics is so constructed and arranged that failure of the pilot valve will not prevent the main valve from opening at a pressure below the danger level.

Mountable in juxtaposition as a unit, the main and pilot valves of the improved pressure relief valve, when the latter is connected to a line on the output side of the compressor, have their valve members exposed to the pressure in that line through a common inlet in the main valve. Each of the valve members is normally held closed by a return spring and that of the pilot valve is adjustable in compression for selecting the pressure at which the pilot valve will open. The preferred valve member of the main valve is a differential piston presenting at its lower end to line pressure a head normally closing the seat through which the air in the line exhausts when the pressure is excessive. A second larger head on the piston, exposable and responsive only to pressure from the pilot valve, preferably is of sufficient presented area to shift the piston to a stop-fixed open position against the force of the associated return spring at a pressure lower than line pressure.

Except for an influx when the pilot valve first opens, the pressure applied through that valve to the larger head of the main valve piston is substantially static and consequently unproductive of flutter in the piston. Although the area of the seat-closing head of the piston is less than that of the head normally responsible for opening, it nonetheless preferably is sufficient to ensure unseating of the piston and exhausting of pressure in the line in the range between the predetermined release pressure of the pilot valve and the danger level.

The foregoing and other objects and features of the invention will appear hereinafter in the detailed description, be particularly pointed out in the appended claims and be illustrated in the accompanying drawings, in which:

FIGURE DESCRIPTION

DETAILED DESCRIPTION

Figure 2:
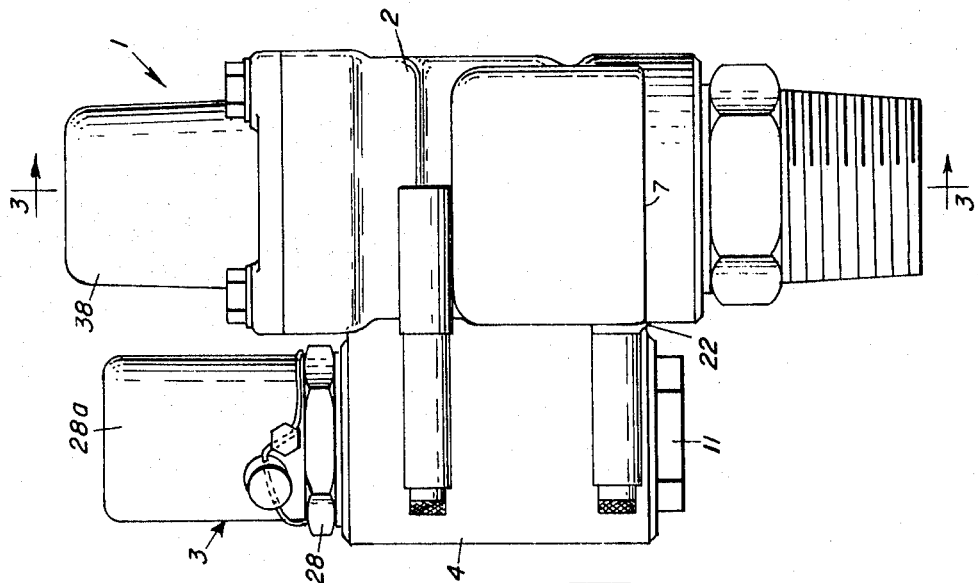
FIG. 2 is a side elevational view of the valve of FIG. 1.
Figure 3:
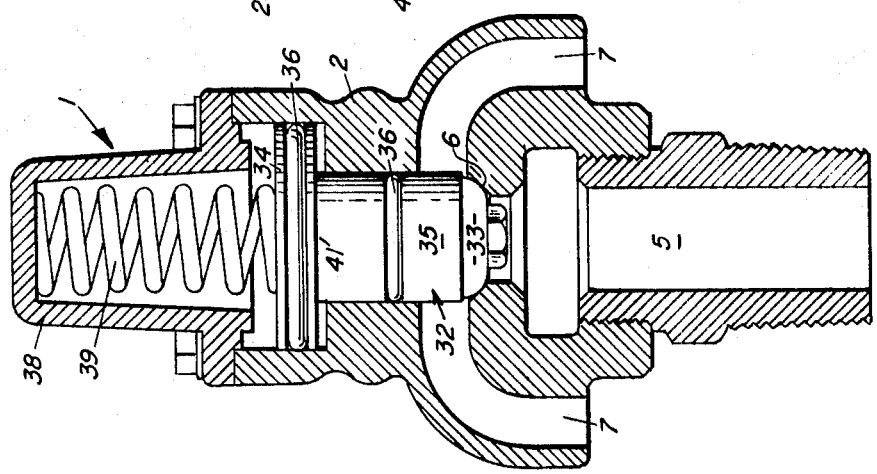
FIG. 3 is a vertical sectional view taken along lines 3-3 of FIG. 2.
Figure 1:
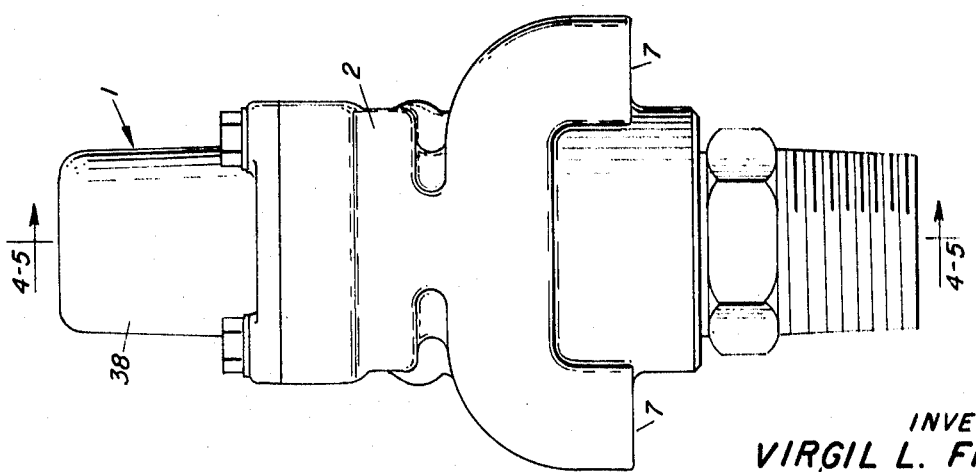
FIG. 1 is an end elevational view of a preferred embodiment of the improved pressure relief valve of the present invention.
Figure 5:
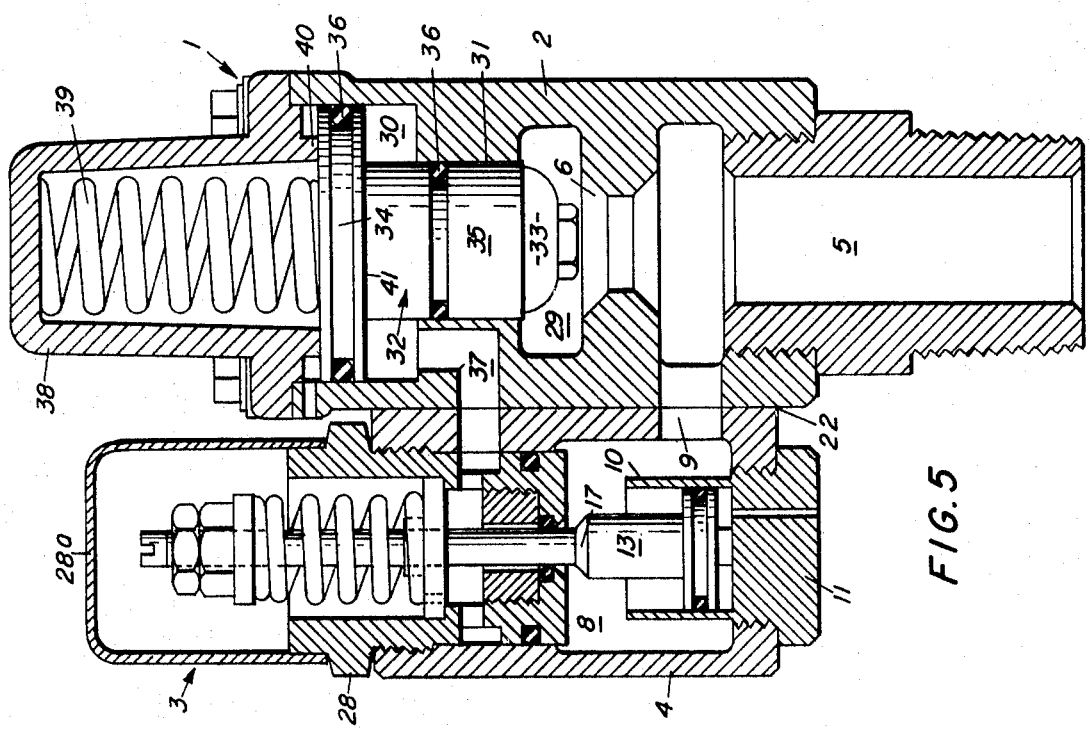
FIG. 5 is a view on the same section and scale as FIG. 4, but with both valves open.
Figure 4:
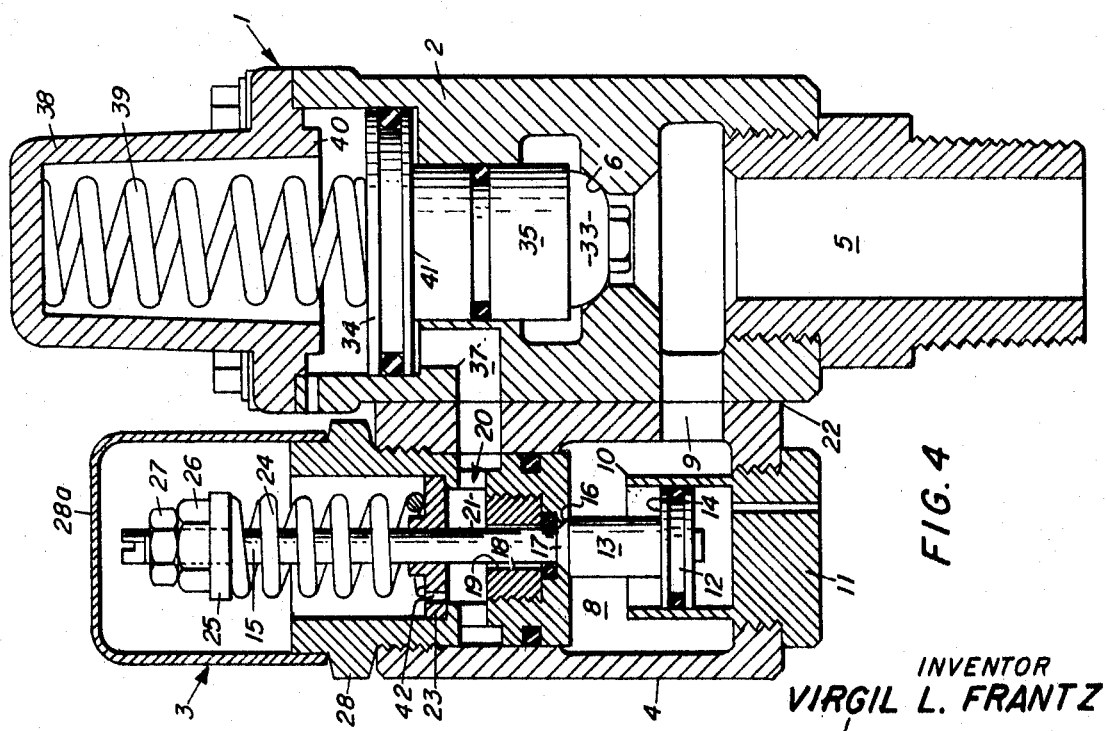
FIG. 4 is a vertical sectional view on an enlarged scale taken along lines 4-4 of FIG. 1.

Referring now in detail to the drawings in which like reference characters designate like parts, the improved diesel locomotive compressed air system pressure relief valve of the present invention is comprised of a main, suitably poppet-type valve 1 having a housing or body 2 and a pilot valve 3 having a housing or body 4. The housings 2 and 4 conveniently are disposed in juxtaposition or side-by-side and the pilot housing is releasably secured, as by bolting, to the main housing to form in effect a common divisible housing and enable the main and pilot valves 1 and 3 to be mounted as a unit.

Connectable and in operation connected to a line (not shown) on the output or outlet side of a diesel locomotive compressor (not shown), conventionally driven by the locomotive's main diesel motor (not shown), the improved pressure relief valve preferably is so connected through an inlet passage or port 5 in the main housing 2. This passage extends upwardly to a valve seat 6 in the main housing through which it is connectable to one or, as disclosed, a pair of exhaust ports 7. Below the seat the inlet passage 5 connects to, opens into or communicates with a valve chamber 8 in the lower part of the pilot housing 4 through a branch passage 9, within which, preferably in a concentric sleeve 10 integral with and upstanding from a plug 11 threaded into the bottom of the housing, rides, slides, or reciprocates the head 12 of the preferred valve member 13 of the pilot valve.

For pressure response laterally sealingly engaging the sleeve 10 so as to present or expose only its upper face 14 to pressure in the chamber 8, the head 12 is fixed or secured to the lower end of the stem 15 of the valve member 13. Vertically disposed, the stem 15 above the chamber 8 projects or extends upwardly through a suitably 0-ringed valve seat 16 normally seating and closed by an upwardly tapered shoulder 17 on the stem therebelow. Above the seat 16, the stem 15 passes through a vertical bore 18 in the housing 4 with a fit sufficiently loose to form between itself and the bore an upstanding leg 19 of an outlet passage 20 leading from the seat. Above the bore 18 the upstanding leg 19 connects to a lateral or horizontal leg 21 of the outlet passage 20 leading to the joint or interface 22 between the housings 2 and 4.

Passing vertically through or across the lateral leg 21 the stem 15 thereabove also passes through a guide bearing or bushing 23, in the case with a sliding fit, and above the bushing is encircled by a coil spring 24 acting or bearing downwardly against the bearing and upwardly on the stem for normally yieldably holding the shoulder 17 in the seat 16. In applying an upward force to the stem 15 on the valve member 13 as a whole, the coil or return spring 24 suitably acts directly on an overlying washer 25 on the stem backed by an adjusting nut 26 and a lock nut 27 thereon. With slotting of the upper end of the stem to receive a turning tool (not shown) the adjusting nut 26 enables the compression of the spring and thus the pressure required to overcome the spring pressure on the head 12 to be adjusted as desired to produce opening of the pilot valve 3 at a selected predetermined pressure in the line from the compressor to which the pressure relief valve is connected. For convenience in assembly and disassembly, the seat 16, bore 18 and lateral leg 21 desirably are formed and the guide bearing 23 is inserted in a plug member 28 screwed into the upper end and forming part of the housing 4. A cap 28a fitting on the upper end of and sealed against tampering to the plug member 28, encloses and protects the upper part of the stem 15.

Within the housing 2 of the main valve 1, the main valve seat 6 opens upwardly onto a lower valve chamber 29 connecting or open to the exhaust ports 7. Also within the housing 2 and spaced above the lower valve chamber 29 is an upper valve chamber 30 and between and opening at opposite ends onto those chambers and concentric with at least the upper chamber and the seat 6 is a guide bore 31. In these chambers and the bore rides or slides a main valve member 32 preferably formed as a double-headed, differential piston having a lower, small or first head 33 in the lower chamber and normally seating in and closing the valve seat 6, and an upper, relatively large second head 34 in the upper chamber and a stem 35 connecting the heads and sliding and guided in the guide bore. Of these elements, the lower head 33 suitably is formed of a rubber or like suitable resilient washer releasably attached to the lower end of the stem 35 and the stem and the upper head 34 sealingly engage the walls of the bore 31 and upper chamber 30, respectively, as by peripherally grooving each to receive and carry or mount a wall-engaging O-ring or other suitable sealing gasket 36. A connecting passage 37 opens onto the bottom of the upper chamber 30 below the upper head 34, and extends therefrom in the housing 2 to the joint or interface 22 between it and the pilot housing 4, where the passage aligns with and connects to the lateral leg 21 of the outlet passage 20 of the pilot valve 3.

The main valve 1 is completed by a cap member 38 attached to the upper end of the housing 2 immediately above the upper chamber 30 and partly containing a return spring 39 acting between it and the upper head 34 at the upper end of the piston 32 for applying a yieldable downward force on the piston which normally holds the lower head 33 in the seat 6 for disconnecting the inlet passage 5 from the exhaust ports 7. An annular flange or shoulder 40 on the upper chamber 30, serves as a stop for limiting upward movement of the piston 32 by engagement with the upper head 34 before the spring has been fully compressed.

When the line pressure on the head 12 of the pilot valve member 13 is sufficient to overcome the opposing force of the pilot return spring 24 and shift the valve member downwardly to open position, air from the compressor outlet line is free to pass by way of the inlet and branch passages 5 and 9 through the valve seat 16 and therefrom through the outlet passage 20 and the connecting passage 37 to the upper valve chamber 30 and act on the underside or underface 41 of the upper head 34 of the main valve member 32. The area presented by the head underside 41 to the air so admitted to the upper chamber 30 is at least greater than that constantly presented by the lower head 33 in closed position through the seat 6 to the line pressure to which it is constantly exposed through the inlet passage 5.

For the improved pressure relief or safety valve to operate as intended, the difference in the presented areas of the upper and lower heads 34 and 33 must at least be such relative to the opposing force, predetermined by the strength and normal compression of the main return spring 39, that the main valve member or piston 32 will shift to open position under the upward force applied to the upper head when the pilot valve is open, but will not so shift while the pilot is closed and only part of the lower head 33 is presented to line pressure. The preferred area difference is greater than this minimum and sufficient to enable the opposing force of the spring 39 to be overcome by a pressure on the upper head considerably or substantially below line pressure, and thus facilitate shifting of the piston 32 to open position, this being made possible in the improved valve by the nonexposure of the upper head to pressure from the line except when the pilot valve is open. While less than the presented area of the upper head 34 and insufficient to overcome the opposing force of the return spring 39 at the pressure at which the pilot valve is set or predetermined to open, the area presented by the lower head 33 in closed position to line pressure preferably is sufficient to open the main valve and connect the line to exhaust somewhere in the range between the predetermined opening pressure of the pilot valve and the level so as to protect the line and devices connected thereto in the unlikely event of failure of the pilot valve.

Although, with suitable pressure settings, adapted to be connected somewhere else in the compressed air system of a diesel locomotive, the improved pressure relief valve usually will have the previously mentioned connection to the output side of a compressor. In such an installation the desired maximum line pressure usually will be about 150 p.s.i. and the pilot valve 3 will be set to open at a pressure on the lower head 33 of about 170—180 p.s.i., which, while above the desired maximum, is still below the critical danger level.

An important feature of the improved pressure relief valve is its ability to maintain the line pressure within a range of about 5 p.s.i. or from 145—150 p.s.i., far narrower than the 140 lbs. p.s.i. range of the conventional direct-acting pressure relief valve. In either case, the lower limit of the range is that at which the valve will close after being opened and the difference in the ranges is the direct result of the difference in the nature of the pressure by which the conventional and improved valves are opened. In the conventional valve, the pressure holding the valve open during exhausting is dynamic, the product of the outrushing air pressing against the valve member as it passes to the exhaust port or ports. By contrast in the improved valve the pressure is substantially static, as, except for the initial inrush of air, on opening of the pilot valve, past the seat 16 to fill the upper chamber 30 below the upper head 34 and in process force the upper head upwardly against the stop 41, there is substantially no movement of the air responsible for opening and holding open the main valve, and any movement there is of the force-applying air is not in the main valve but in the pilot valve and due to escape of air through the bleed port 42 in the guide bearing 23, which, by bleeding air back from the upper chamber 30 when the pilot valve closes, enables the main valve to close.

It is the above necessary bleeding that is primarily responsible for the difference between the opening and closing pressures of the pilot valve. Nonetheless, since the bleed port 42 is restricted and the permissive flow through it low, the head 12 of the valve member 13 while open and in closing is subjected to substantially static air pressure with consequent narrowness of the pressure range between opening and closing. Conversely, the conventional valve is both held open by and closes against the dynamic pressure of the outrushing air. Over compression of the main return spring 39 being prevented by the limit on upward movement of the main valve member 32 imposed by the stop 49 and the pressure holding the valve member open being substantially static, the causes of fluttering in the conventional pressure relief valve are not present and the main valve member, instead of fluttering, will be held stationarily against the stop 40 while the valve is open.

From the above detailed description, it will be apparent that there has been provided an improved pressure relief valve for diesel locomotive compressed air systems which is nonfluttering and enables the pressure in the output line from the compressor to be held within narrow limits. It should be understood that the described and disclosed embodiment is merely exemplary of the invention and that all modifications are intended to be included that do not depart from the spirit of the invention and the scope of the appended claims.

Having now described my invention, I claim:

1. In a diesel locomotive compressed air system including a compressor having an outlet line, a pressure relief valve comprising a main valve having a body, spaced inlet and exhaust ports in said body and connected respectively to said line and to atmosphere, a valve seat in said body between said inlet and exhaust ports and connected by an inlet passage therein to said inlet port, a valve member in said body and having a first head normally yieldably seated in and closing said seat and exposed therethrough to pressure in said line, a second head on said valve member and sealed against flow therepast and from said exhaust port and normally unexposed to pressure in said line, and a pilot valve mounted on said main valve body and having an inlet connected through said inlet passage to said line and an outlet leading to said second head, said pilot valve opening in response to a predetermined pressure in said line for unseating said first head and opening said main valve by applying pressure through an outlet to said second head and thereafter until closing applying substantially static pressure to said second head for holding said main valve open.

2. A pressure relief valve according to claim 1, including means for adjusting the predetermined pressure at which the relief valve will open.

3. A pressure relief valve according to claim 2, including bleed port means in the body of the pilot valve for bleeding therethrough upon closing thereof of the pressure applied to the second head.

4. A pressure relief valve according to claim 2, including spring means in the main valve body and applying a force opposing line pressure on the first head for normally yieldably holding the first head in the seat, and wherein the area presented by the first head when closed to line pressure is less than the area presented by the second head to pressure received through the pilot valve but sufficient to overcome the opposing force of said spring means and open the main valve in a pressure range between the predetermined opening pressure of the pilot valve and a danger level.

5. A pressure relief valve according to claim 2, including a chamber in the main valve body receiving the second head, said chamber being connected to the outlet of the pilot valve on a side of the second head facing in the same direction as the first head, and stop means carried by the main valve body and facing an opposite side of the second head for limiting movement thereof in an opening direction.

6. A pressure relief valve according to claim 5, wherein the area presented by the second head to pressure applied through the pilot valve is greater than the area presented by the first head to line pressure and sufficient upon opening of the pilot valve under the predetermined line pressure to open the main valve under a lower pressure.

7. A pressure relief valve according to claim 2, including bleed port means in the body of the pilot valve for bleeding the pressure applied to the second head on closing of the pilot valve, and nonadjustable spring means in the main valve body for normally holding the first head in the seat, and wherein the area presented by the first head when closed to line pressure is sufficient to overcome the spring means and open the main valve in a pressure range above the predetermined opening pressure of the pilot valve and below a danger level.